United States Patent [19]

Burghoff

[11] Patent Number: 5,117,577
[45] Date of Patent: Jun. 2, 1992

[54] FISH ATTRACTOR DEVICE

[76] Inventor: Gary Burghoff, 5800 Overseas Highway, Suite 35-143, Marathon, Fla. 33050

[21] Appl. No.: 609,906

[22] Filed: Nov. 5, 1990

[51] Int. Cl.$^5$ .............................. A01K 97/02
[52] U.S. Cl. ........................ 43/44.99; 43/56
[58] Field of Search ............ 43/44.99, 42.49, 16, 43/43.13, 56, 4, 4.5

[56] References Cited

U.S. PATENT DOCUMENTS

| | | | |
|---|---|---|---|
| 1,410,817 | 3/1922 | Lloyd | 43/44.99 |
| 3,006,105 | 10/1961 | Lewis | 43/44.99 |
| 3,084,471 | 4/1963 | Alspaugh | 43/44.99 |
| 3,717,124 | 2/1973 | Jacobs | 43/55 |
| 4,297,804 | 11/1981 | Weld | 43/55 |
| 4,638,593 | 1/1987 | Garcia | 43/56 |
| 4,672,764 | 6/1987 | Dempsey | 43/4 |
| 4,856,222 | 8/1989 | Hannam | 43/4.5 |
| 4,903,429 | 2/1990 | Tetenes | 43/44.99 |

OTHER PUBLICATIONS

Popular Mechanics "Float for the Young Fishermasn", vol. 66, Sep. 1936.

Primary Examiner—Richard K. Seidel
Assistant Examiner—Jeanne M. Elpel
Attorney, Agent, or Firm—Frijouf, Rust & Pyle

[57] ABSTRACT

An apparatus and method is disclosed for a fish attractor device for use on a surface of a body of water to entice fish with a chum material. The improved fish attractor device comprises a body member having a volume for floating the body member on the surface of the body of water. The body member supports a porous container for receiving the chum material enabling the chum material to migrate through the porous container into the body of water for luring fish thereby. The body member is adapted to ride upon currents of oceans and rivers to remove the device from human activity and transport a baited line of a fisherman to a remote location. At the remote location, the body member shades a portion of the body of water to create an artificial haven for fish.

16 Claims, 5 Drawing Sheets

FISH ATTRACTOR DEVICE

BACKGROUND OF THE INVENTION

1. Field Of The Invention

This invention relates to fishing and more particularly to a device for enticing fish with a chum material and for creating an artificial haven for fish.

2. Information Disclosure Statement

The process of chumming has been well known in the fishing art for many year. In the process of chumming, a chum material such as portions of fish are dispersed in the body of water The fish are enticed to the chumming material.

U.S. Pat. No. 1,410,817 to Walter J. Lloyd relates to a fishing appliance device for catching larger sea and fresh water animals and which indicates to an observer at a distant point, as to whether anything has been caught upon the hook, or other element associated with the fishing appliance.

U.S. Pat. No. 3,006,105 to Elmer Lewis relates to an improvement in fishing tackle comprising a casting float having means for distributing chum within a selected fishing area.

U.S. Pat. No. 3,084,471 to Alspaugh for controlling the disposition of a fishing line relative to a fixed support.

U.S. Pat. No. 3,717,124 to Jacobs illustrates a fish culture cage assembly which includes an annular float ring having a foraminous, cylindrical cage structure having an open upper end and a closed lower end detachably depending from said flange and a lid detachably secured to said float ring and covering the open top of said cage structure. A cylindrical feeding ring may be detachably suspended from projections inside the foraminous cage in the upper portion thereof. The feed ring has a plurality of openings which are substantially smaller than the openings through the cage, the feed ring being open at the upper and lower ends.

U.S. Pat. No. 4,297,804 to Weld discloses a floating container which is shaped like a small boat to be pulled behind a fishing vessel. The container is transparent so that the bait carried therein can be seen and thus attract game fish in the surrounding water. The container is structured to provide proper aeration for the bait while allowing access to the bait.

U.S. Pat. No. 4,638,593 to Garcia teaches a boat-shaped fishing accessory comprises an enclosed hull having a live bait compartment and an adjoining insulated compartment for storing food beverages and other articles. A pair of tubular rod holders are angularly disposed on each side of the hull to receive and hold fishing rods.

U.S. Pat. No. 4,903,429 to Tetenes discloses a device to attract fish consisting of a bucket held within a net suspended downwardly from a float into a body of water. The bucket holds frozen fish chum so that open top of the bucket is at a right distance below water line allowing pieces of defrosted fish chum to be dispensed from the bucket and float on the water to attract the fish.

It is and object of the present invention to improve upon the foregoing devices and to provide an improved fish attractor device comprising a body member having an aperture for receiving a porous container for enabling a chum material within the container to migrate into a body of water for luring fish thereby.

Another object of this invention is to provide an improved fish attractor device incorporating an outrigger for releasably securing a fishing line.

Another object of this invention is to provide an improved fish attractor device incorporating an outrigger for releasably securing a fishing line wherein the outrigger may be moved between a retracted position and an extended position.

Another object of this invention is to provide an improved fish attractor device incorporating a plurality of body members with means for interlinking the plurality of body members enabling the plurality of body members to shade a portion of the body of water to create an artificial haven for fish.

Another object of this invention is to provide an improved fish attractor device which is low cost, reliable and easy to clean after use.

The foregoing has outlined some of the more pertinent objects of the present invention. These objects should be construed as being merely illustrative of some of the more prominent features and applications of the invention. Many other beneficial results can be obtained by applying the disclosed invention in a different manner or modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention an relates to an improved method and apparatus for a fish attractor device for use on a surface of a body of water to entice fish with a chum material. The improved fish attractor device comprises a body member having a body member top surface, a body member bottom surface and body member side surface means. The body member top surface, body member bottom surface and body member side surface means define a body member volume for floating the body member on the surface of the body of water. An aperture is disposed in the body member with the aperture extending between the top surface and the bottom surface of the body member. A container having a container bottom surface and container side surface means extends from the container bottom surface for defining a container internal volume. The container side surface includes a container peripheral rim for defining an open top of the container. The container is receivable within the aperture in the body member with the container peripheral rim of the container engaging with the top surface of the body member and with the container bottom surface disposed below the surface of the body of water. The container side surface means is porous for enabling the chum material to be inserted within the container internal volume and to migrate through the container side surface means into the body of water for luring fish thereby. The improved fish attractor device may be practiced with a plurality of body members with means for linking the plurality of body members enabling the plurality of body members to shade a portion of the body of water to create an artificial haven for fish.

In a more specific embodiment of the invention, the body member comprises an upper rigid material bonded to a lower foam material Preferably, the body member comprises an upper sheet of rigid plastic material bonded to a lower sheet of a foam material with a carrying handle defined in the upper sheet of the rigid plastic material. The lower foam material has foam side surface means which is tapered from the body member top surface to the body member bottom surface.

In one embodiment of the invention, the aperture in the body member extends substantially perpendicular to the top surface of the body member. The container comprises a unitary resilient material with the container side surface means tapering from the container peripheral rim of the container to the container bottom surface. The container is receivable within the aperture in the body member with the container side surface means resiliently engaging the aperture in the body member when the container peripheral rim of the container engages with the top surface of the body member.

A container cover may be provided for covering the open top of the container. The container cover comprises a cover lid and a cover peripheral rim with the container cover overlying the open top of the container when the cover peripheral rim engages with the top surface of the body member. Means are provided for retaining the container cover to the body member.

The invention may optionally include an outrigger secured to the body member for releasably securing a fishing line. The outrigger comprises an outrigger pole having a proximal end and a distal end with the proximal end being secured to the body member and with an outrigger release secured to the distal end of the outrigger pole. The proximal end may be slidable secured to the body member enabling the outrigger pole to be moved between a retracted position and an extended position.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which.

Similar reference characters refer to similar parts throughout the several Figures of the drawings.

DETAILED DISCUSSION

Figure 1:
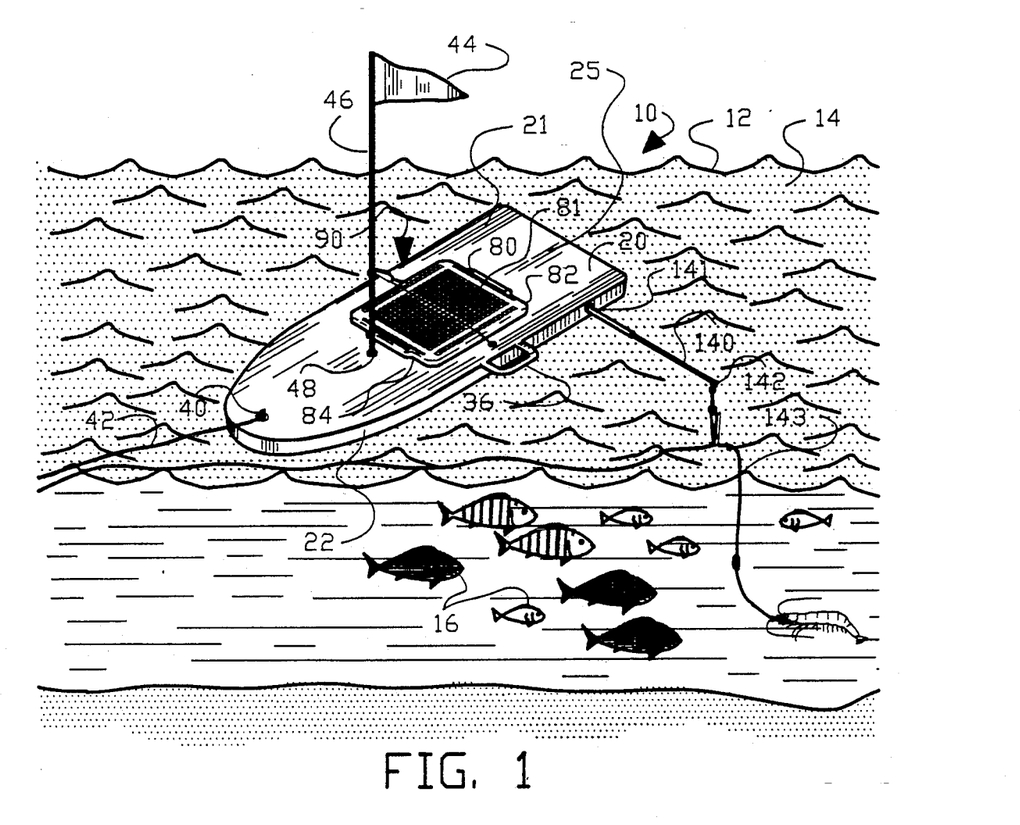
FIG. 1 is an isometric view of a first embodiment of an improved fish attractor device.
Figure 2:
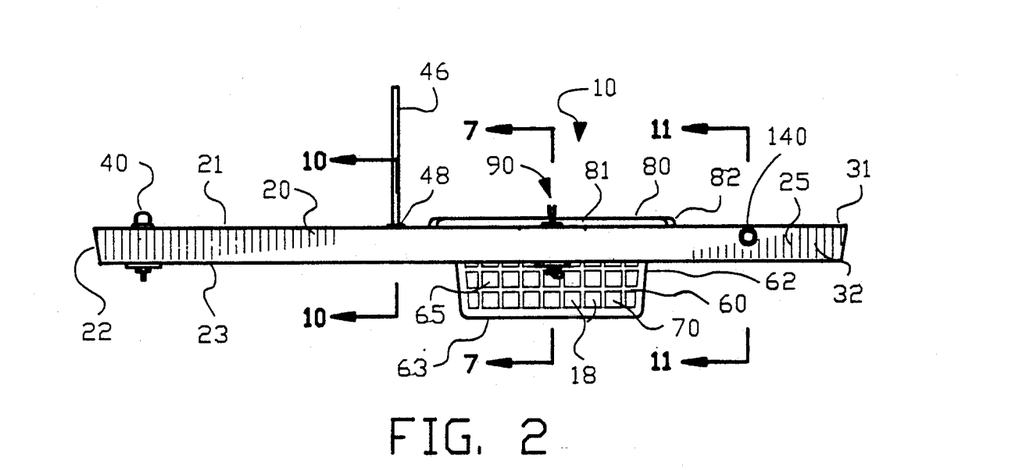
FIG. 2 is a side elevational view of the improved fish attractor device of FIG. 1.
Figure 3:
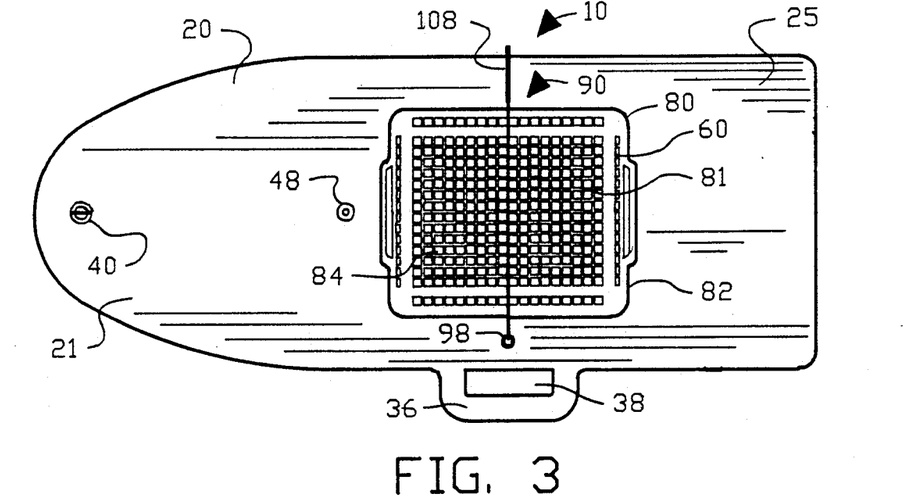
FIG. 3 is a top view of FIG. 2.
Figure 4:
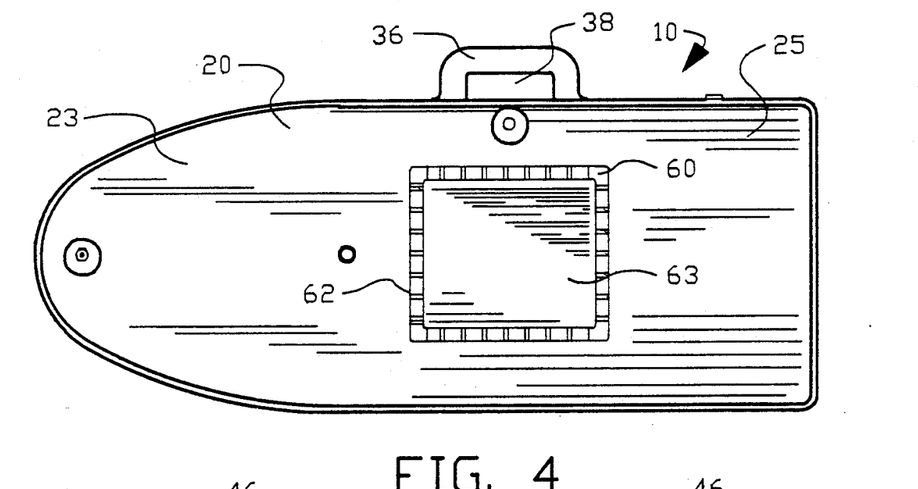
FIG. 4 is a bottom view of FIG. 2.
Figure 5:
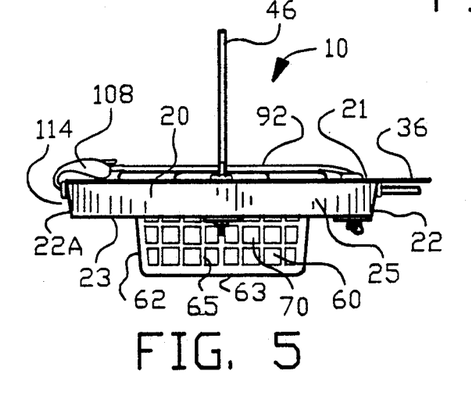
FIG. 5 is a front view of FIG. 2.
Figure 6:
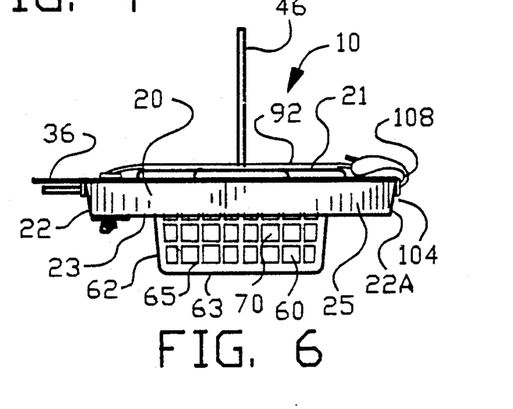
FIG. 6 is a rear view of FIG. 2.

FIG. 1 is an isometric view of a first embodiment of an improved fish attractor device 10 of the present invention with FIGS. 2-6 illustrating additional views thereof. The improved fish attractor device 10 is adapted for use on a surface 12 of a body of water 14 to entice fish 16 with a chum material 18. The fish attractor device 10 comprises a body member 20 having a body member top surface 21, body member side surface means 22 and a body member bottom surface 23. The body member top surface 21, the body member side surface means 22 and the body member bottom surface 23 defining a body member volume 25 for floating the body member 20 on the surface 12 of the body of water 14 as shown in FIG. 1.

Figure 7:
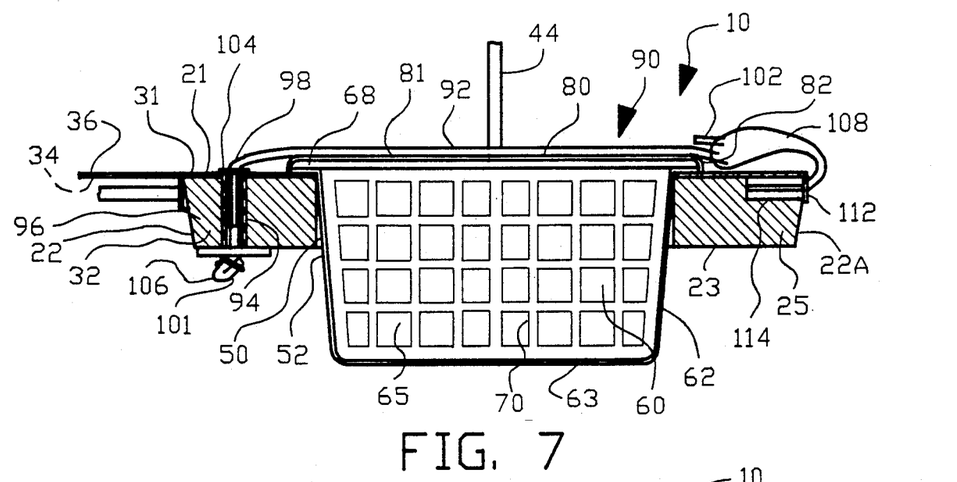
FIG. 7 is a sectional view along line 7—7 in FIG. 2.
Figure 8:
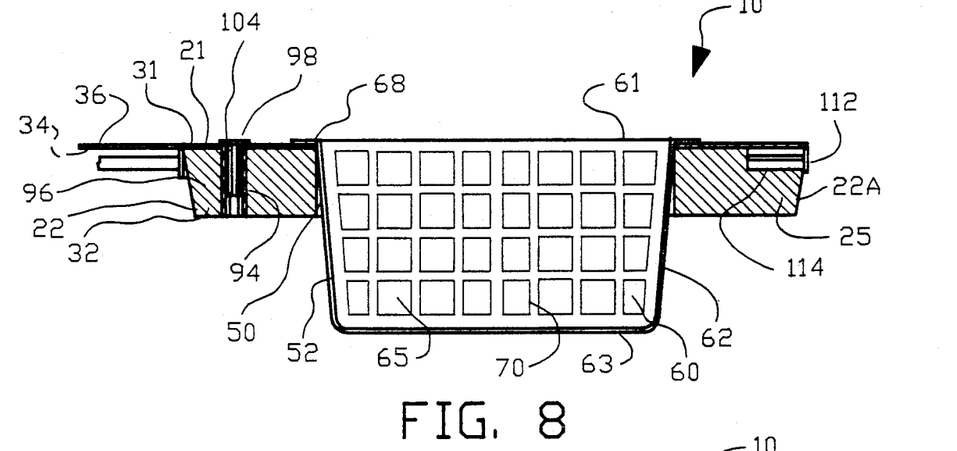
FIG. 8 is a sectional view similar to FIG. 7 with a cover being removed.
Figure 9:
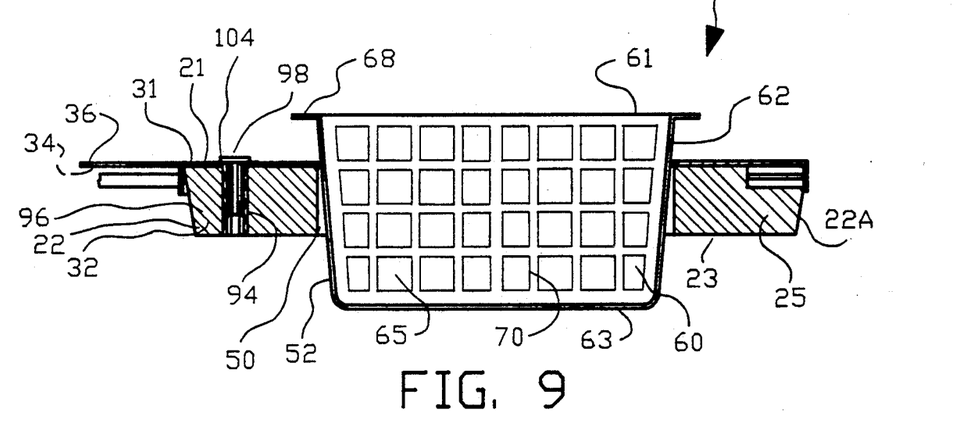
FIG. 9 is a sectional view similar to FIG. 7 with a container being removed.

As better shown in FIGS. 7-9, the body member 10 comprises an upper rigid material 31 bonded to a lower foam material 32. Preferably, the upper sheet of rigid material 31 is a generally rigid plastic material bonded by an adhesive 34 to the lower sheet of a foam material 32 which is preferably a low cost closed cell foam such as styrofoam.

The body member 20 supports a carrying handle 36 for carrying the fish attractor device 10 to and from the body of water 14. In this embodiment, the carrying handle 36 is integrally formed as a projection from the upper rigid material 31 with a slot 38 defining a hand receiving region.

A coupling means 40 is attached to the body member 20 for receiving a rope 42 for anchoring or towing the improved fish attractor device 10. A locating flag 44 attached to a flag pole 46 is removably received in a grommet 48 secured to the body member 20. The locating flag 44 assists in the location of the fish attractor device 10 in the body of water 14.

The lower foam material 32 defines a portion of the body member side surface means 22 which is tapered from the body member top surface 21 to the body member bottom surface 23 to provide a proper fluid dynamic shape in the event that the fish attractor device 10 is towed behind a boat or the like. In addition, the fish attractor device 10 may be released from a shoreline or a boat (not shown) to drift away from the shoreline or boat to a remote location limited by the rope 42.

An aperture 50 is defined in the body member 20 and extends between the body member top surface 21 and the body member bottom surface 23 of the body member 10. The aperture 50 defines aperture side surface means 52 extending substantially perpendicular to the top surface 21 of the body 10 member 20.

A container 60 has an open top 61 defined by container side surface means 62 extending from a container bottom surface 63. The container side surface means 62 and the container bottom surface 63 define a container internal volume 65. The container side surface means 62 includes a container peripheral rim 68 extending about the open top 61 of the container 60. The container side surface means 62 includes pores 70 for enabling the chum material 18 to be inserted within the container internal volume 65 and to migrate through the pores 70 of the container side surface means 62. The container side surface means 62 tapers from the container peripheral rim 68 to the container bottom surface 63. Preferably, the container 60 is a unitary resilient material, such as plastic or the like for enabling the container to be readily cleaned of any remaining chum material 18 after use of the present invention.

FIGS. 1-7 illustrate the container 60 received within the aperture 50 in the body member 20 with the container peripheral rim 68 engaging with said top surface 21 of the body member 20. As best shown in FIG. 7, the container side surface means 62 resiliently engage the aperture side surface means 52 to secure the container 60 to the body member 20. A portion of the container side surface means 62 and the container bottom surface 63 is disposed below the surface 12 of the body of water 14 for enabling the chum material 18 to migrate through the pores 70 into the body of water 14 for luring the fish 16 thereby.

A container cover 80 comprising a cover lid 81 and a cover peripheral rim 82 for covering the open top 61 of the container 60. The cover lid 81 overlies the open top 61 of the container when the cover peripheral rim 82 engages with the top surface 21 of the body member 20. The cover lid 81 includes pores 84 for enabling water flow therethrough.

A retaining means 90 including an elastic cord 92 secure the container cover 80 to the body member 20. A vertical tube 94 is secured by adhesive or the like to a vertical orifice 96 defined in the body member 20. A plug 98 is received within the vertical tube 96 with a first end 101 of the elastic cord 92 extending through a hole 104 in the plug 98. The first end 101 is secured to the hole 104 in the plug 98 by conventional means such as a knot 106. A second end 102 of the elastic cord 92 is secured to a hook 108. The hook 108 is receivable within an indentation 112 of a grommet 114 adhesively mounted to the body member side surface 22A for securing the container cover 80 to the body member 20 as shown in FIGS. 1-7.

Since the tension force of the elastic cord 92 is applied in a horizontal direction and parallel to the top surface 21 of the body member 20, the horizontal tension force does not provide a vertical force to extract the plug 98 from the vertical tube 96. Accordingly, the plug 98 may be fictionally secured within the vertical tube 96 enabling the plug 98 and the interior of the vertical tube 96 to be readily cleaned after use.

FIG. 8 illustrates the elastic cord 92 and the plug 98 as well as the container cover 80 removed from the body member 20. The removal of the container cover 80 enables the chum material 18 to be inserted within the container internal volume 65 of the container 60.

FIG. 9 illustrate the removal of the container 60 from the body member 20 for cleaning and/or storage. The container 60 may be replaced with another container (not shown) having pores of a different size relative to the pores 70 of the container 60. A different size pore will alter the porosity of the container side surface means 62 and accordingly alter the rate of migration of the chum material 18 into the body of water 14.

Figure 10:
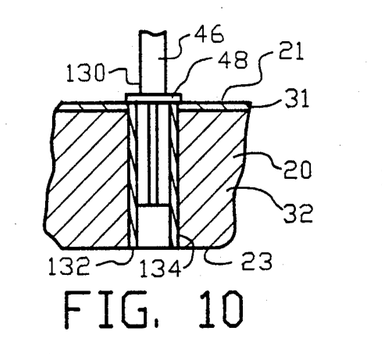
FIG. 10 is a sectional view along line 10—10 in FIG. 2.

FIG. 10 is a detailed sectional view of the flag pole 46 being frictionally received within a grommet hole 130 in the grommet 48. The grommet 48 is secured to a vertical tube 132 mounted in a vertical hole 134 in the body member 20. The locating flag 44 and flag pole 46 assists in the location of the fish attractor device 10 in the body of water 14 and may be readily removed for transportation and storage.

Figure 11:
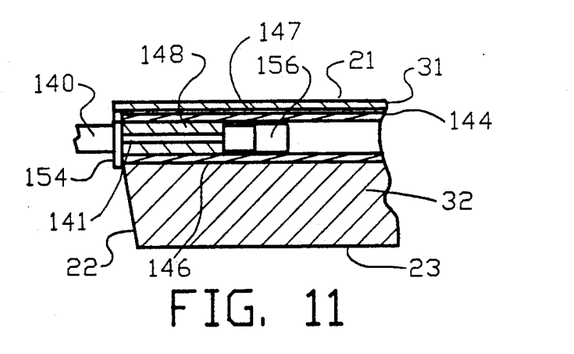
FIG. 11 is a view along line 11—11 in FIG. 2.

FIG. 11 is an enlarged isometric view of a portion of the first embodiment shown in FIG. 1 showing an outrigger pole 140 having a proximal end 141 and a distal end 142. The outrigger pole is mounted to the body member 20 for releasably securing a fishing line 143. A horizontal tube 144 is secured by adhesive or the like to a horizontal orifice 146 defined in the lower foam material 32 of the body member 20 as well as being secured by an adhesive 147 to the upper rigid material 31 of the body member 20. This plural adhesion to the lower foam material 32 as well as the upper rigid material 31 provides a secure mounting for the outrigger pole 140.

A plug 148 is frictionally received within the horizontal tube 144 with the proximal end 141 of the outrigger pole 140 slidably extending through a hole 154 in the plug 148. The proximal end 141 is slidably secured to the hole 154 in the 12 plug 148 by a stop 156. The stop limits the outward extension of the outrigger pole 140.

Figure 12:
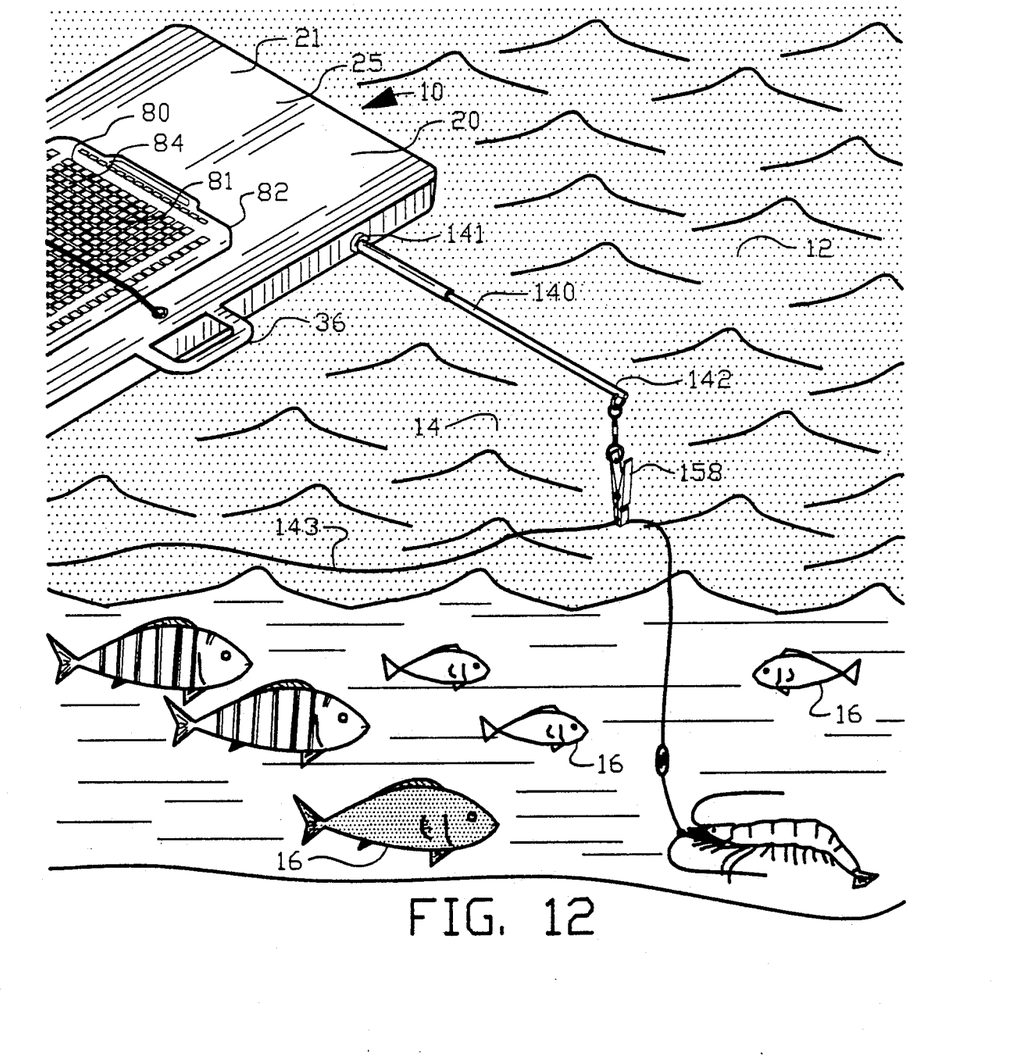
FIG. 12 is an enlarged isometric view of a portion of the first embodiment shown in FIG. 1.

As best shown in FIG. 12, the distal end 142 of the of the outrigger pole 140 supports an outrigger release 158 for releasably holding the fishing line 143. The operation of a outrigger release should be well known to those skilled in the art. The outrigger pole 140 may be moved between a retracted position and an extended position. The outrigger pole 140 is moved into the extended position during use and is moved into the retracted position for transportation and storage. Since the plug 148 is frictionally received within the horizontal tube 144, the plug 148 and the outrigger pole 140 may be removed for readily cleaning the interior of the horizontal tube 144.

Figures 13, 14, 15:
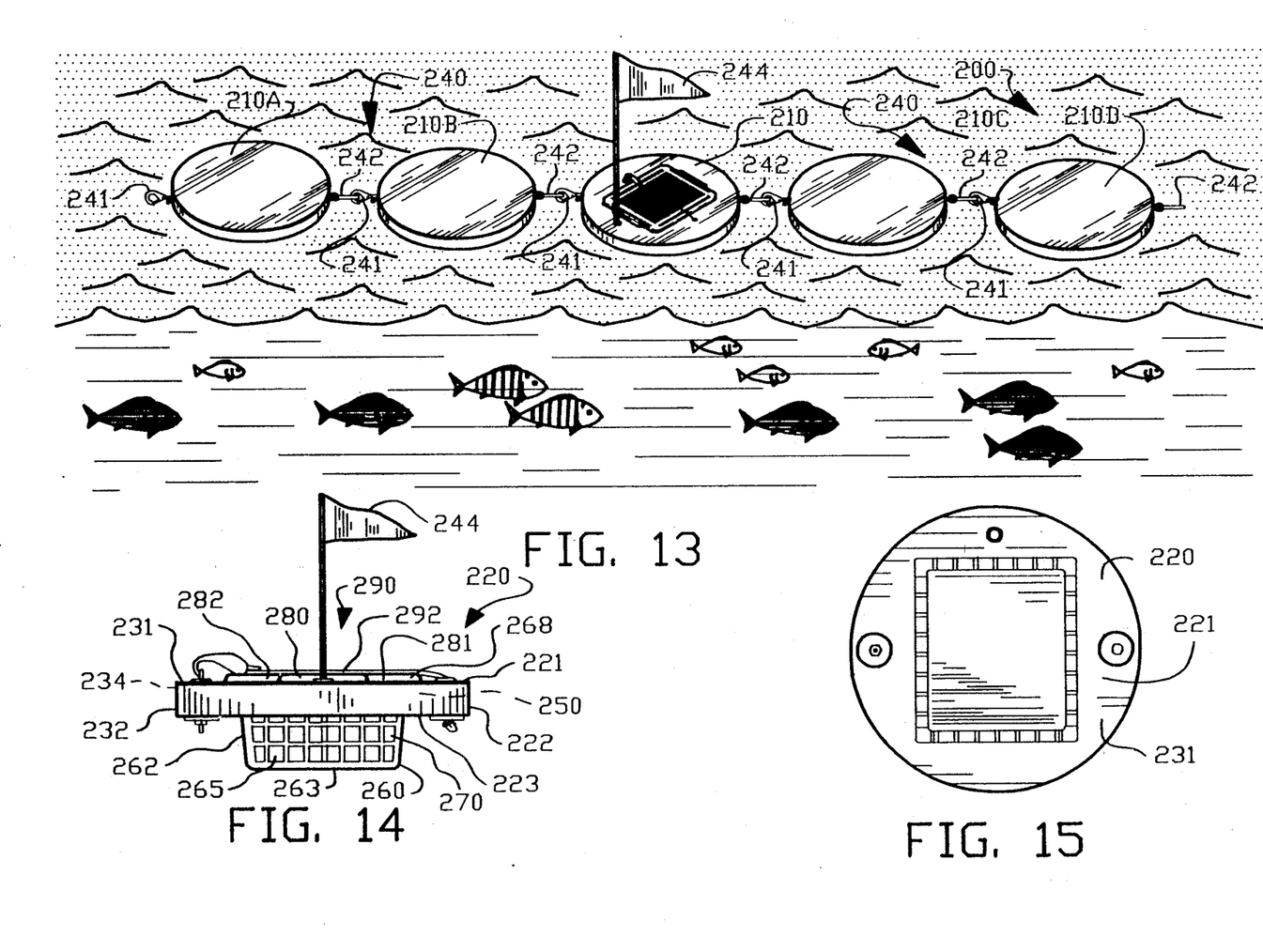
FIG. 13 is an isometric view of a second embodiment of a plurality of improved fish attractor devices.
FIG. 14 is a side elevational view of the improved fish attractor device of FIG. 13.
FIG. 15 is a top view of FIG. 13.

FIG. 13 is an isometric view of a second embodiment of an improved fish attractor device 200 comprising a plurality of fish attractor devices 210 and 210A-210D with FIG. 14 being a side elevational the and FIG. 15 being a top view of the fish attractor. Each of the fish attractor devices 210 and 210A-210D comprises a body member 220 having a body member top surface 221, body member side surface means 222 and a body member bottom surface 223 defining a body member volume 225 for floating the body member 220.

The body member 210 comprises an upper rigid material 231 bonded to a lower foam material 232 bonded together by an adhesive 234. Coupling means 240 comprising a first and a second coupling 241 and 242 is attached to opposed ends of the body member 210 for linking the plurality of body members 210 and 210A-210D enabling the plurality of body members 210 and 210A-210D to shade a portion of the body of water 14 to create an artificial haven for fish. A locating flag 244 may be optionally attached to the body member 210 for assisting in the location of the plurality of body members 210 in the body of water 14.

An aperture 250 is defined in the body member 210 to extend between the body member top surface 221 and the body member bottom surface 223. A container 260 similar to container 60 has an open top defined by container side surface means 262 extending from a container bottom surface 263 to establish a container internal volume 265. A container peripheral rim 268 extends about the open top of the container 260. The container side surface means 262 tapers from the container peripheral rim 268 to the container bottom surface 263 and includes pores 270 for enabling the chum material 18 to migrate through the pores 270 of the container side surface means 262.

The container 260 is received within the aperture 250 in with the container peripheral rim 268 engaging with the top surface 221 and with the container side surface means 262 resiliently engage the aperture 250 to secure the container 260 to the body member 210. A container cover 280 comprising a cover lid 281 and a cover peripheral rim 282 overlies the open top 261 of the container 260 when the cover peripheral rim 282 engages with the top surface 221. A retaining means 290 including an elastic cord 292 secures the container cover 280 to the body member 210 in a manner similar to FIGS. 1-12. The coupling means 240 enables the plurality of body members 210 and 210A-210D to be interlinked to enable the plurality of body members 210 and 210A-210D to shade a portion of the body of water 14 to create an artificial haven for fish. The shade portion provided by the plurality of interlinked body members 210 attract small fish as a secure environmental haven. The presence of the small fish attract larger fish which feed upon the smaller fish. Accordingly, the plurality of interlinked body members 210 and 210A-210D not only provides a shade area to establish a secure environmental haven for small fish but also provides a platform for releasing the chum material 18 at a controlled rate through the pores 270 of the container side surface means 262.

The improved fish attractor device of the present invention provides a body member having an aperture for receiving a porous container for enabling a chum material within the container to migrate into a body of water for luring fish thereby.

The invention may incorporate an outrigger for releasably securing a fishing line wherein the outrigger may be moved between a retracted position and an extended position. A plurality of body members may be interlinked to shade a portion of the body of water to create an artificial haven for fish. The fish attractor device is low cost, reliable and easy to clean after use.

The fish attractor device of the present invention is specifically designed to ride upon currents of oceans and rivers to remove the fish attractor device from human activity and transport a baited line of a fisherman to a remote location. The fish attractor device may be released from a boat or from shore to drift by a current to the remote location. At the remote location, the body member shades a portion of the body of water to create an artificial haven for fish.

The fish attractor device of the present invention may be released from a shoreline or a boat (not shown) to drift away from the shoreline or boat to a remote location limited by the rope 42. Concomitantly therewith, the fish attractor device carries the fishing line 143 to the remote location. At the remove location, the fish attractor device shades the body of water thereby creating an artificial haven for fish as well as allowing the chum material to migrate from the container for luring fish thereby.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

I claim:

1. An improved fish attractor device for use on a surface of a body of water to entice fish with a chum material, comprising:

a longitudinally extending body member having a body member top surface, a body member bottom surface and body member side surface means;

said body member top surface, body member bottom surface and body member side surface means defining a body member volume for floating said body member on the surface of the body of water;

said body member having the general shape of a boat including a generally pointed bow portion and a stern portion for enabling said body member to negotiate the body of water;

an aperture disposed in said body member with said aperture extending between said top surface and said bottom surface of said body member;

a container having container side surface means extending from a container bottom surface for defining a container internal volume;

said container side surface including a container peripheral rim for defining an open top of said container;

said container being receivable within said aperture in said body member with said container peripheral rim of said container engaging with said top surface of said body member and with said container bottom surface disposed below the surface of the body of water;

coupling means secured to said bow of said body member for receiving a rope for enabling the fish attractor device to drift by currents of oceans and rivers to a remote location limited by said rope with said body member providing a shaded portion in the body of water to create an artificial haven for fish;

said container side surface means being porous for enabling the chum material to be inserted within said container internal volume and to migrate through said container side surface means into the body of water for luring fish thereby; and said longitudinally extending body member having a longitudinal length at least twice as great as a transverse width of said body member for providing lateral stability to said fish attractor device when subjected to currents of oceans and rivers.

2. An improved fish attractor device as set forth in claim 1, wherein said body member comprises a upper rigid material bonded to a lower foam material.

3. An improved fish attractor device as set forth in claim 1, wherein said body member comprises a upper sheet of rigid plastic material bonded to a lower sheet of a foam material.

4. An improved fish attractor device as set forth in claim 1, wherein said body member comprises a upper sheet of rigid plastic material bonded to a lower sheet of a foam material; and a carrying handle defined in said upper sheet of said rigid plastic material.

5. An improved fish attractor device as set forth in claim 1, wherein said body member comprises a upper rigid material bonded to a lower foam material; and said lower foam material having a foam side surface means which is tapered from said body member top surface to said body member bottom surface.

6. An improved fish attractor device as set forth in claim 1, wherein said aperture in said body member extends substantially perpendicular to said top surface of said body member.

7. An improved fish attractor device as set forth in claim 1, wherein said container comprises a unitary resilient material.

8. An improved fish attractor device as set forth in claim 1, wherein said container side surface means tapers from said container peripheral rim of said container to said container bottom surface.

9. An improved fish attractor device as set forth in claim 1, wherein said aperture in said body member extends substantially perpendicular to said top surface of said body member;

said container comprising a unitary resilient material;

said container side surface means tapering from said container peripheral rim of said container to said container bottom surface; and said container being receivable within said aperture in said body member including said container side surface means resiliently engaging said aperture in said body member when said container peripheral rim of said container engages with said top surface of said body member.

10. An improved fish attractor device as set forth in claim 1, including a container cover for covering said open top of said container.

11. An improved fish attractor device as set forth in claim 1, including a container cover for covering said open top of said container;

said container cover comprising a cover lid and a cover peripheral rim; and said container cover overlying said open top of said container with said cover peripheral rim engaging with said top surface of said body member.

12. An improved fish attractor device as set forth in claim 1, including a container cover for covering said open top of said container;

said container cover comprising a cover lid and a cover peripheral rim;

said container cover overlying said open top of said container with said cover peripheral rim engaging with said top surface of said body member; and means for retaining said container cover to said body member.

13. An improved fish attractor device as set forth in claim 1, including a locating flag secured to said body member for locating said body member.

14. An improved fish attractor device for use on a surface of a body of water to entice fish with a chum material, comprising:

a body member having a body member top surface, a body member bottom surface and body member side surface means;

said body member top surface, body member bottom surface and body member side surface means defining a body member volume for floating said body member on the surface of the body of water;

an aperture disposed in said body member with said aperture extending between said top surface and said bottom surface of said body member;

a container having container side surface means extending from a container bottom surface for defining a container internal volume;

said container side surface including a container peripheral rim for defining an open top of said container;

said container being receivable within said aperture in said body member with said container peripheral rim of said container engaging with said top surface of said body member and with said container bottom surface disposed below the surface of the body of water;

said container side surface means being porous for enabling the chum material to be inserted within said container internal volume and to migrate through said container side surface means into the body of water for luring fish thereby; and an outrigger secured to said body member for releasably securing a fishing line.

15. An improved fish attractor device as set forth in claim 14, wherein said outrigger comprises an outrigger pole having a proximal end and a distal end with said proximal end being secured to said body member; and an outrigger release secured to said distal end of said outrigger pole.

16. An improved fish attractor device as set forth in claim 14, wherein said outrigger comprises an outrigger pole having a proximal end and a distal end;

said proximal end being secured to said body member in a sliding engagement enabling said outrigger pole to be moved between a retracted position and an extended position; and an outrigger release secured to said distal end of said outrigger pole.

* * * * *